United States Patent
Yan et al.

(10) Patent No.: US 12,150,113 B2
(45) Date of Patent: Nov. 19, 2024

(54) CONTROL SIGNAL DESIGN BASED ON A DOWNLINK CONTROL INFORMATION FORMAT

(71) Applicant: LENOVO (BEIJING) LIMITED, Beijing (CN)

(72) Inventors: Zhi Yan, Beijing (CN); Haipeng Lei, Beijing (CN); Hongmei Liu, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 514 days.

(21) Appl. No.: 17/604,411

(22) PCT Filed: Mar. 29, 2019

(86) PCT No.: PCT/CN2019/080311
§ 371 (c)(1),
(2) Date: Oct. 16, 2021

(87) PCT Pub. No.: WO2020/198904
PCT Pub. Date: Oct. 8, 2020

(65) Prior Publication Data
US 2022/0225357 A1 Jul. 14, 2022

(51) Int. Cl.
*H04W 72/12* (2023.01)
*H04L 1/08* (2006.01)
(Continued)

(52) U.S. Cl.
CPC ........... *H04W 72/1263* (2013.01); *H04L 1/08* (2013.01); *H04L 5/0053* (2013.01); *H04W 4/90* (2018.02);
(Continued)

(58) Field of Classification Search
CPC ... H04W 28/04; H04W 72/04; H04W 72/042; H04W 88/08; H04W 72/1263;
(Continued)

(56) References Cited

U.S. PATENT DOCUMENTS

| | | | |
|---|---|---|---|
| 2018/0198594 A1* | 7/2018 | Tiirola | H04L 5/0051 |
| 2018/0279157 A1* | 9/2018 | Dinan | H04W 52/46 |

(Continued)

FOREIGN PATENT DOCUMENTS

| | | | | |
|---|---|---|---|---|
| CN | 112930707 A | * | 6/2021 | ........ H04W 72/0446 |
| CN | 113056954 A | * | 6/2021 | ............ H04W 52/14 |

(Continued)

OTHER PUBLICATIONS

3GPP TSG RAN WG1 Meeting #96, Athens, Greece, Feb. 25-Mar. 1, 2019, R1-1901866, Source: ZTE, Title: Support for transmission in preconfigured UL resources for NB-IoT, Agenda item: 6.2.2.2. (Year: 2019).*

(Continued)

*Primary Examiner* — Peter G Solinsky
*Assistant Examiner* — Sanjay K Dewan
(74) *Attorney, Agent, or Firm* — Kunzler Bean & Adamson (57) ABSTRACT

Methods and apparatuses for preconfigured uplink resource are disclosed. A method at a remote unit comprises transmitting a data in a predefined resource based on a resource configuration; and receiving a control signal in a first search space, wherein the control signal includes at least one of (1) a response to the data; (2) an updated TA; (3) an updated power; (4) an updated data transmission repetition; (5) a flag of retransmission based on dynamic grant or the predefined resource; (6) a fallback indication; and (7) a predefined resource release indication.

18 Claims, 4 Drawing Sheets

(51) Int. Cl.
*H04L 5/00* (2006.01)
*H04W 4/90* (2018.01)
*H04W 60/04* (2009.01)
*H04W 68/00* (2009.01)
*H04W 72/1263* (2023.01)
*H04W 72/14* (2009.01)
*H04W 72/23* (2023.01)

(52) U.S. Cl.
CPC ......... *H04W 60/04* (2013.01); *H04W 68/005* (2013.01); *H04W 72/23* (2023.01)

(58) Field of Classification Search
CPC ....... H04W 4/90; H04W 72/23; H04W 60/04; H04W 68/005; H04W 72/14; H04L 5/0007; H04L 1/108; H04L 5/0053
USPC ......................................................... 370/329
See application file for complete search history.

(56) References Cited

U.S. PATENT DOCUMENTS

2022/0030605 A1* 1/2022 Hu .................. H04L 5/0092
2022/0191969 A1* 6/2022 Zheng ............... H04W 76/20

FOREIGN PATENT DOCUMENTS

| CN | 113424632 A | * | 9/2021 | ........ H04W 72/0446 |
| CN | 114451034 A | * | 5/2022 | ........ H04W 72/0446 |
| WO | WO 2013/017154 A1 | * | 2/2013 | ............ H04W 72/04 |
| WO | WO 2018117033 A1 | * | 6/2018 | ............ H04W 72/04 |
| WO | WO 2020167100 A1 | * | 8/2020 | ............ H04W 52/48 |
| WO | WO 2020226394 A1 | * | 11/2020 | ............ H04W 24/08 |

OTHER PUBLICATIONS

3GPP TSG RAN WG1 Meeting #96, Athens, Greece, Feb. 25-Mar. 1, 2019 R1-1903254, Agenda Item: 6.2.2.2, Source: Huawei, HiSilicon, Title: Feature lead summary of Support for transmission in preconfigured UL resources. (Year: 2019).*

International Searching Authority, "Written Opinion of the International Searching Authority," PCT/CN2019/080311, Dec. 26, 2019, pp. 1-3.

ZTE, Support for transmission in preconfigured UL resources for NB-IoL, 3GPP TSG RAN WG1 Meeting #96, 1-1901866, Feb. 25-Mar. 1, 2019, pp. 1-11, Athens, Greece.

Huawei, Hisilicon, Feature lead summary of Support for transmission in preconfigured UL resources, 3GPP TSG RAN WG1 Meeting #96, R1-1903254, Feb. 25-Mar. 1, 2019, pp. 1-23, Athens, Greece.

* cited by examiner

CONTROL SIGNAL DESIGN BASED ON A DOWNLINK CONTROL INFORMATION FORMAT

FIELD

The subject matter disclosed herein generally relates to wireless communications and, more particularly, to control signal design for preconfigured uplink resource (PUR) configuration.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Downlink (DL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Physical Uplink Shared Channel (PUSCH), Preconfigured Uplink Resource (PUR), Machine type Communication (MTC), MTC Physical Downlink Control Channel (MPDCCH), Narrowband Physical Downlink Control Channel (NPDCCH), Re-Authorization-Request (RAR), Radio Resource Control (RRC), Tracking Area (TA), Modulation and Coding Scheme (MCS), Redundant Version (RV), Acknowledgement (ACK), Negative Acknowledgment (NACK), Downlink Control Information (DCI), Coverage Enhancement (CE), System Information Block (SIB), Random Access Channel (RACH), Early Data Transmission (EDT), System Information (SI), Earthquake and Tsunami Warning System (ETWS), Commercial Mobile Alert System (CMAS).

Figure 4:
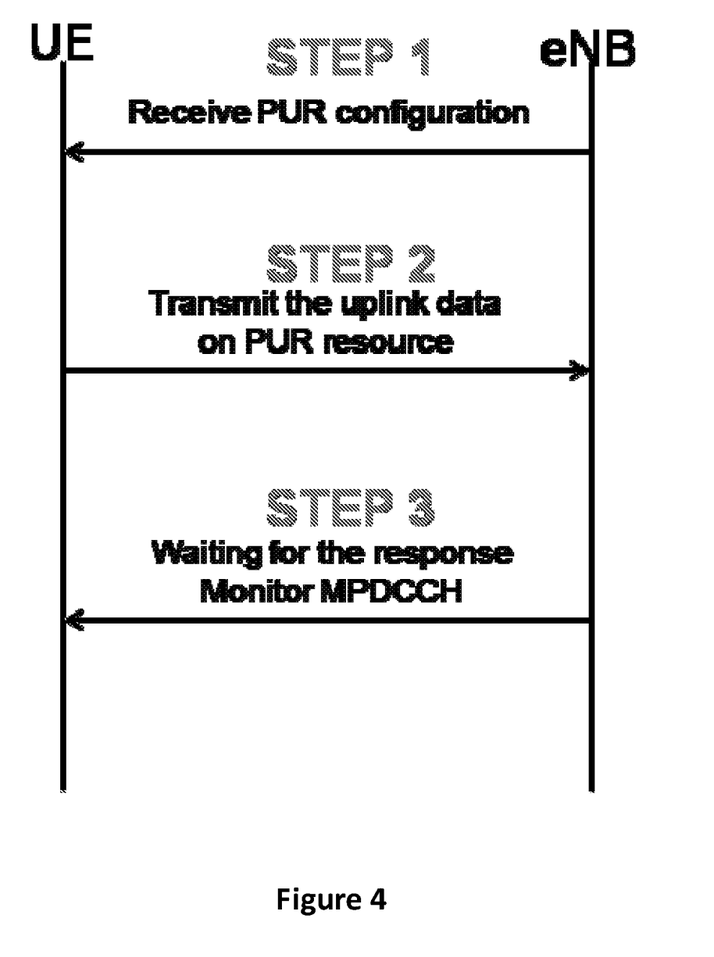
FIG. 4 illustrates a basic procedure of uplink transmission based on PUR.

A basic procedure of uplink transmission based on preconfigured uplink resource (PUR) is shown in FIG. 4.

In step 1, UE receives PUR configuration from eNB before transitioning to an IDLE state. In step 2, based on the PUR configuration, UE transmits uplink data in IDLE state. In step 3, UE monitors MPDCCH or NPDCCH for a response to determine whether the uplink data transmission was successful or unsuccessful. Alternatively, the UE may receive a retransmission grant.

After performing uplink transmission based on received PUR configuration, UE expects to receive either an explicit ACK or an explicit NACK or an uplink retransmission grant on MPDCCH or NPDCCH. How to design a unified DCI for different CE modes and how to design an optimized DCI or reduced DCI to improve MPDCCH/NPDCCH detection performance is a big issue for RAN1 specification.

After the PUSCH transmission, UE has to monitor at least 3 search spaces in IDLE state, i.e. MPDCCH or NPDCCH type 1 common search space for paging, MPDCCH or NPDCCH type 2 common search space for RAR, and PUR search space, which could be designed as common search space for all UEs or UE-specific search space for dedicated PUR. The narrowbands of the three search spaces are RRC-configured separately, which means that the three search spaces may overlap, especially the PUR search space may overlap with MPDCCH or NPDCCH type 1 common search space or with MPDCCH or NPDCCH type 2 common search space in time domain or frequency domain. It is yet unknown how to specify UE's behavior (e.g. which search space UE should monitor) when the PUR search space overlaps with MPDCCH or NPDCCH type 1 common search space or with MPDCCH or NPDCCH type 2 common search space.

In this disclosure, the invention proposes solutions to solve the above-identified problems.

BRIEF SUMMARY

Methods and apparatuses for control signal design are disclosed.

In one embodiment, a method at a remote unit comprises transmitting a data in a predefined resource based on a resource configuration; and receiving a control signal in a first search space, wherein the control signal includes at least one of (1) a response to the data; (2) an updated TA; (3) an updated power; (4) an updated data transmission repetition; (5) a flag of retransmission based on dynamic grant or the predefined resource; (6) a fallback indication; and (7) a predefined resource release indication.

In some embodiment, the response to the data is an ACK or a NACK to the data (e.g., the uplink data transmission was successfully or unsuccessfully received). The updated TA is an index of a TA set or an index offset to an index corresponding to previously adopted TA. The updated power is an index of a power set or an index offset to an index corresponding to previously adopted power. The updated data transmission repetition is an index of a data transmission repetition set or an index offset to an index corresponding to previously adopted data transmission repetition.

In some embodiment, the method may further comprise receiving multiple sets of scheduling delay, and determining a set of scheduling delay based on a coverage mode, wherein the control signal further includes an indication of scheduling delay based on the set of scheduling delay. Alternatively, the method may further comprise receiving multiple references scheduling delays, and determining a reference scheduling delay based on a coverage mode, wherein the control signal further includes an indication of scheduling delay based on the reference scheduling delay. In other embodiment, the method may further comprise receiving multiple sets of repetition number, and determining a set of repetition number based on a coverage mode, wherein the control signal further includes an indication of repetition number based on the set of repetition number. Alternatively, the method may further comprise receiving multiple reference repetition numbers, and determining a reference repetition number based on a coverage mode, wherein the control signal further includes an indication of repetition number based on the reference repetition number.

In some embodiment, the resource configuration includes at least one of a scheduling delay set, a repetition number set, a reference scheduling delay and a reference repetition number. In this condition, the control signal further includes an indication of scheduling delay based on the scheduling delay set or the reference scheduling delay, and an indication of repetition number based on the repetition number set or the reference repetition number. The control signal may include a predefined bit pattern, wherein the predefined bit pattern indicates at least one of retransmission based on next predefined resource, fallback and predefined resource release.

In some embodiment, the method further comprises monitoring a second search space for paging message or random access, wherein the second search space is partially or fully overlapped with the first search space in a time or frequency resource. In particular, the method further determines to monitor the first search space or the second search space with one of the following manners: always monitoring the first search space; always monitoring the second search space; based on a search space indication; and based on at least one of a period of paging occasion, a period of the predefined resource, a period of control signal monitoring and a control signal monitoring window.

In some embodiment, the control signal further includes at least one of SI (System Information) modification indication, ETWS (Earthquake and Tsunami Warning System) indication and CMAS (Commercial Mobile Alert System) indication. The method may further comprise receiving a paging message, which includes the response to the data. Alternatively, the method may further comprise receiving a random access response message, which includes the response to the data.

In another embodiment, a remote unit comprises a transmitter that transmits a data in a predefined resource based on a resource configuration; and a receiver that receives a control signal in a first search space, wherein the control signal includes at least one of (1) a response to the data; (2) an updated TA; (3) an updated power; (4) an updated data transmission repetition; (5) a flag of retransmission based on dynamic grant or the predefined resource; (6) a fallback indication; and (7) a predefined resource release indication.

In yet another embodiment, a method at a base unit comprises receiving a data in a predefined resource based on a resource configuration; and transmitting a control signal, wherein the control signal includes at least one of (1) a response to the data; (2) an updated TA; (3) an updated power; (4) an updated data transmission repetition; (5) a flag of retransmission based on dynamic grant or the predefined resource; (6) a fallback indication; and (7) a predefined resource release indication.

In further embodiment, a base unit comprises a receiver that receives a data in a predefined resource based on a resource configuration; and a transmitter that transmits a control signal, wherein the control signal includes at least one of (1) a response to the data; (2) an updated TA; (3) an updated power; (4) an updated data transmission repetition; (5) a flag of retransmission based on dynamic grant or the predefined resource; (6) a fallback indication; and (7) a predefined resource release indication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
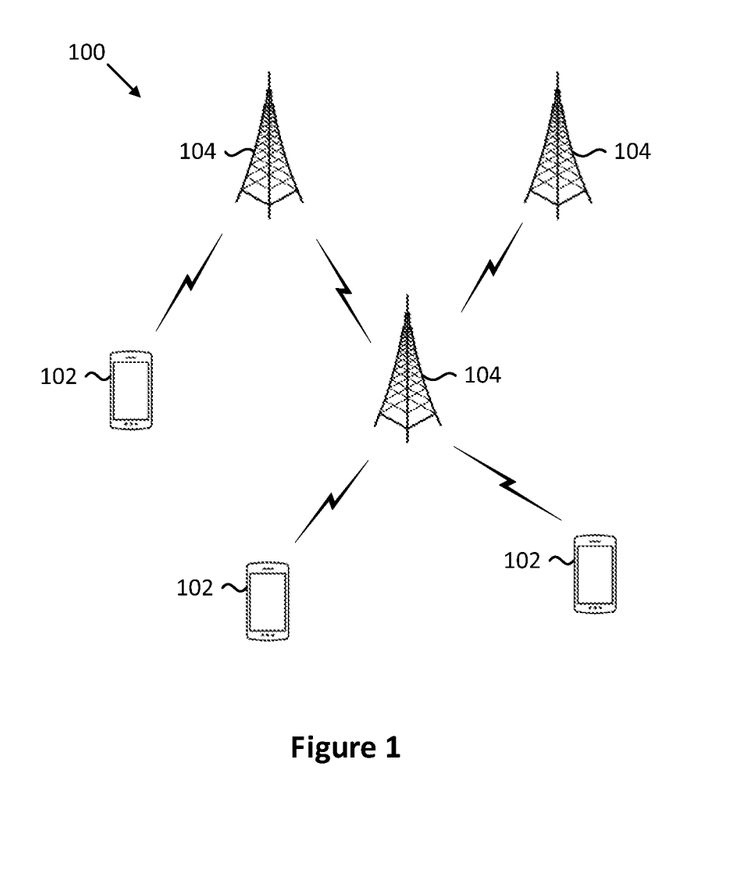
FIG. 1 is a schematic block diagram illustrating one embodiment of a wireless communication system.

FIG. 1 depicts an embodiment of a wireless communication system 100 for control signal design. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, a smart watch, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art. The remote units 102 may also be Narrow Band Internet of Things (NB-IoT) terminals.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

The control node 106 is a control plane network element that handles signaling related to mobility and security for the remote units 102. For example, the control node 106 may be a Mobility Management Entity (MME).

Figure 2:
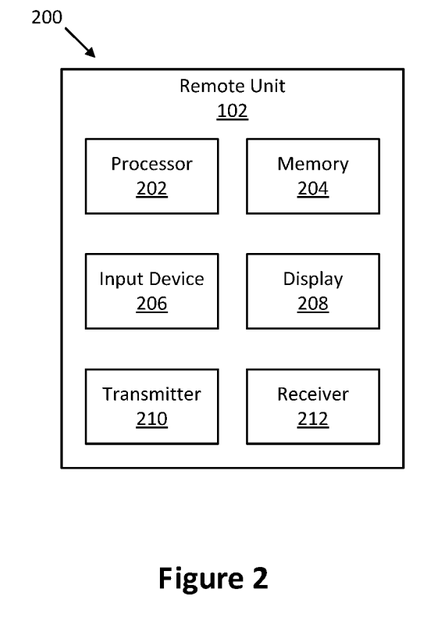
FIG. 2 is a schematic block diagram illustrating one embodiment of an apparatus that may be used for control signal design.

FIG. 2 depicts one embodiment of an apparatus 200 that may be used in the present invention. The apparatus 200 represents a single embodiment of the remote unit 102. Such remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or a display 208. In various embodiments, the remote unit 102 may include at least one of the processor 202, the memory 204, the transmitter 210 and the receiver 212, and may not include the input device 206 and/or the display 208.

The processor 202, in one embodiment, may include or represented by any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or a similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104.

In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
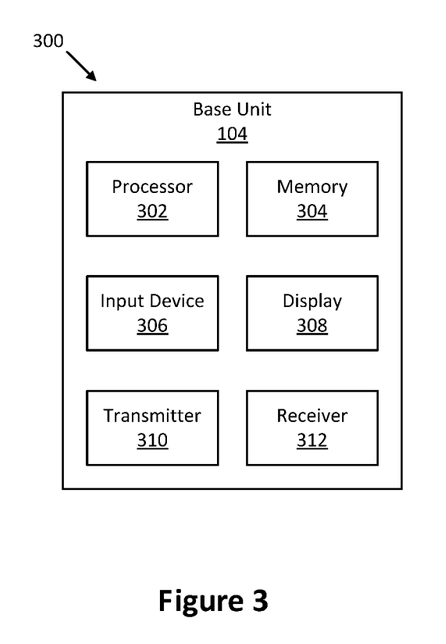
FIG. 3 is a schematic block diagram illustrating one embodiment of another apparatus that may be used for control signal design.

FIG. 3 depicts one embodiment of another apparatus 300 that may be used in the present invention. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 5:
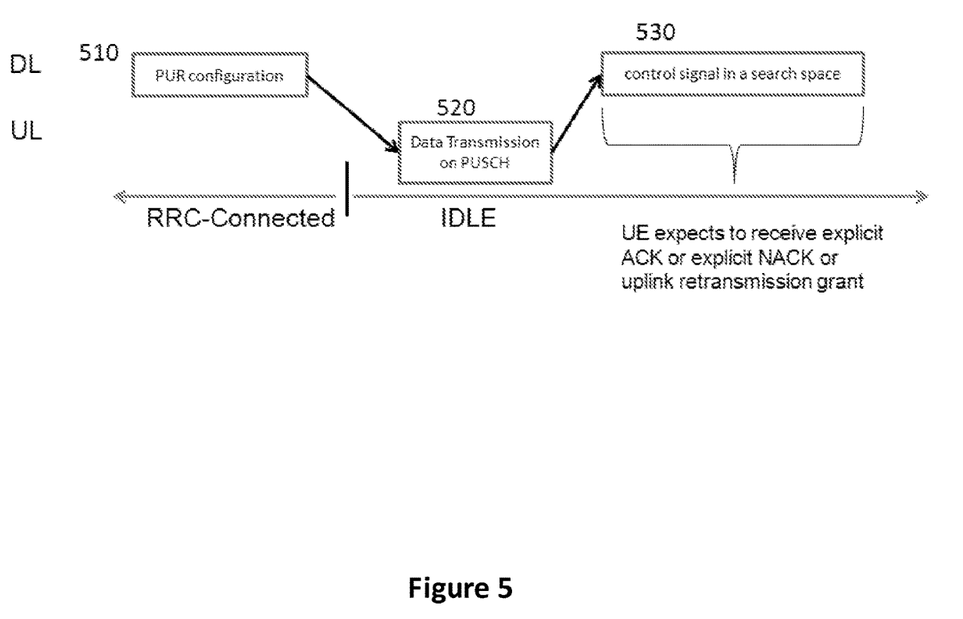
FIG. 5 illustrates a schematic figure of a method according to the present invention.

FIG. 5 illustrates a schematic diagram of a method according to the present invention. "DL" represents that in steps 510 and 530, data or control signal is transmitted from eNB (not shown in FIG. 5) to UE (not shown in FIG. 5) while "UL" denotes that in step 520, data is transmitted from the UE to the eNB.

Step 510 of FIG. 5 corresponds to step 1 of FIG. 4, in which UE is in an RRC-Connected state. In the step 510, PUR configuration is transmitted from eNB to the UE. Step 520 of FIG. 5 corresponds to Step 2 of FIG. 4, during which UE is in an IDLE state while performing data transmission on PUSCH based on the PUR configuration, to the eNB. Step 530 of FIG. 5 corresponds to step 3 of FIG. 4, in which UE is still in the IDLE state while monitoring a search space and expecting to receive explicit ACK or explicit NACK or uplink retransmission grant.

An explicit ACK or an explicit NACK or an uplink retransmission grant will be included in a control signal sent from the eNB.

It is possible to reuse traditional DCI format 6-0A or 6-0B as the control signal. However, a lot of existing fields in the DCI format 6-0A or 6-0B (such as HARQ process number, TPC command, UL index, DAI, SRS request, etc) are useless for the control signal. In view of the above, this disclosure proposes a new DCI (referred to as PUR DCI hereinafter) format to send the control signal.

The PUR DCI according to a first embodiment is described as follows.

The PUR DCI includes a field of ACK/NACK indication. The ACK/NACK indication may be 1 bit to explicitly indicate ACK (for example, value=1) or NACK (for example, value=0). The ACK signal represents that transmission on PUSCH was successfully received by the eNB. The NACK signal, on the other hand, means that transmission on PUSCH was not successfully received at the eNB.

Upon the ACK/NACK indication field indicating an ACK signal, the PUR DCI may further include parameters that may be frequently changing, such as an updated TA, updated power, updated repetition number, etc. Therefore, it is preferable that these frequently changing parameters are also updated along with ACK indication (for example, ACK/NACK indication value=1). Incidentally, the repetition number means the repetition number for the data transmitted on PUSCH.

Each of the above-mentioned parameters such as updated TA, updated power, and updated repetition number included in the control signal may be represented by an index value or an index offset value. The index value refers to an index corresponding to a value in a set, while the index offset value refers to an offset to an index corresponding to the previously adopted value.

For example, suppose the repetition number may be selected from a repetition set of {1, 2, 4, 8, 16, 32, 64, 128}, if the index value is used, then 3 bits that can indicate eight different indices are necessary to indicate one value from the repetition number set {1, 2, 4, 8, 16, 32, 64, 128}. For example, [000] may indicate repetition number being 1, [001] may indicate repetition number being 2, . . . , and [111] may indicate repetition number being 128. On the other hand, if the index offset value is used, then 1 or 2 bits are necessary to indicate the offset depending on a range of the offset. For example, if the range of the offset is {−1, 1}, i.e. one index from the previously indicated index, then 1 bit is enough. In particular, if the previously adopted repetition number is 8, which means that the index corresponding to the repetition number 8 is [011], then [0] may indicate an offset of −1, i.e. the index will be [011]−=[010], which indicates the new repetition number being 4. Similarly, [1] may indicate the offset of 1, i.e. the index will be [011]+1=[100], which indicates the new repetition number being 16. If the range of the offset is set to {−2, −1, 1, 2} or {−2, −1, 0, 1}, 2 bits are necessary to indicate the index offset value.

The number of bits (1 or 2 in the above example) for indicating the index offset is smaller than the number of bits (3 in the above example) for indicating the index. Therefore, the index offset indication is preferable than the index indication since it can reduce the number of bits used for indication.

In the situation when ACK/NACK indication field indicates a NACK, the PUR DCI may further include a retransmission type indicator field. The retransmission type indicator field may be a 1 bit filed to signal UE as to how retransmission should be performed. There are two ways for the UE to perform the retransmission. The first way is for UE to perform retransmission based on the next PUR resource. The second way is for UE to perform retransmission based on a dynamic scheduling (i.e. upon receiving the uplink retransmission grant included in the PUR DCI). The retransmission type indicator field may be set to [1] to indicate retransmission being based on the next PUR resource or may be set to [0] to indicate retransmission being based on the dynamic scheduling.

In the condition where retransmission is being based on the next PUR resource, some adjustment parameters for the uplink retransmission may also be included in the PUR DCI, such as MCS, RV, repetition number, etc. In particular, MCS is the modulation and code scheme for the uplink retransmission. RV is the redundant version of the uplink retransmission. Repetition number is the repetition number of the uplink retransmission.

In the condition of retransmission being based on the dynamic scheduling, the following parameters may be included in the PUR DCI: resource assignment, scheduling delay, MCS, RV, repetition number, DCI repetition number. Among these parameters, the MCS, the RV and the repetition number have been previously discussed in the condition of retransmission being based on the next PUR resource.

Other parameters, i.e. resource assignment, scheduling delay and the DCI repetition number are used for scheduling the uplink retransmission.

A UE may be configured in different coverage modes. There are two coverage enhancement (CE) modes specified for UE in RRC-CONNECTED state, i.e. CEmode A and CEmode B. The CEmode A describes a set of behaviors for no repetition and small number of repetitions for transmission, while the CEmode B describes a set of behaviors for a large number of repetitions to be performed for transmission. For eMTC UE in IDLE state, considering the low mobility feature, it assumes that UE in IDEL state is configured to follow the same coverage mode as in the RRC-CONNECTED state. On the other hand, the UE in IDLE state may alternatively be in CE level 1, 2, 3 or 4 or other CE level definition which may be related to different transmission repetitions. The CE level may also be regarded as CE mode. In different CE modes, the parameters such as scheduling delay set, repetition number set, etc are quite different. Therefore, it is inefficient to configure the parameters (parameter sets) included in the PUR DCI to contain all of possible values for both CEmode A and CEmode B. For example, the repetition number set for CEmode A may be {1, 2, 4, 8, 16, 32, 64, 128} while the repetition number set for CEmode B may be {32, 64, 128, 256, 512, 1024, 2048, 4096}. In this condition, if one repetition number set is configured for both CEmode A and CEmode B, the one repetition number set would be 11, 2, 4, 8, 16, 32, 64, 128, 256, 512, 1024, 2048, 40961, and four bits are necessary to indicate one value from the repetition number set {1, 2, 4, 8, 16, 32, 64, 128, 256, 512, 1024, 2048, 4096}. On the other hand, three bits are enough for indicating the repetition number set {1, 2, 4, 8, 16, 32, 64, 128} or the repetition number set {32, 64, 128, 256, 512, 1024, 2048, 4096}.

In view of the above, this disclosure proposes that eNB configures two sets of parameters (scheduling delay set, repetition number set) for CEmode A and CEmode B separately via a broadcast channel (e.g., SIB1). UE determines a set of parameters based on its CE mode. For example, the repetition number set is {1, 2, 4, 8, 16, 32, 64, 128} for CEmode A and is {32, 64, 128, 256, 512, 1024, 2048, 4096} for CEmode B. When a UE receives a repetition number index [010] in DCI, the UE in CEmode A will recognize that the repetition number will be configured as 4 based on the repetition number set configured for CEmode A while the UE in CEmode B will recognize that the repetition number will be configured as 128 based on the repetition number set configured for CEmode B.

In the above example, different sets (e.g. different repetition number sets) for CEmode A and CEmode B are broadcasted to the UE. Alternatively, the eNB may send, via PUR configuration, a particular set (e.g. a particular repetition number set and/or a particular scheduling delay set) to a UE to indicate the particular set for that UE. For example, the eNB may send a repetition number set {1, 2, 4, 8, 16, 32, 64, 128} to a UE if the UE is configured as CEmode A while send another repetition number set {32, 64, 128, 256, 512, 1024, 2048, 4096} to another UE if the other UE is configured as CEmode B.

In the above, the set(s) (e.g. repetition number set(s)) is/are broadcasted to or directly sent to the UE. Alternatively, a reference value (for example, the maximum value or the minimum value) contained in a set rather than the set itself may be broadcasted or sent to the UE. As the UE knows in advance the rule for constructing the set from the reference value, the UE may know the set when receiving the reference value. For example, for the repetition number set {1, 2, 4, 8, 16, 32, 64, 128} to be sent to the UE, the eNB may only send a reference repetition number (for example, the maximum repetition number Rmax=128, or the minimum repetition number Rmin=1) to the UE to indicate the repetition number set as {Rmax/128, Rmax/64, . . . , Rmax/2, Rmax}={1, 2, 4, 8, 16, 32, 64, 128}. This is possible because UE knows in advance the rule for constructing the repetition number set {1, 2, 4, 8, 16, 32, 64, 128} from the reference repetition number. Similarly, the eNB may configure multiple (e.g. two) reference values (e.g. reference scheduling delays, reference repetition numbers) for CEmode A and CEmode B separately, and broadcast or directly send them to the UE. For example, the UE may receive multiple reference scheduling delays and determine a reference scheduling delay based on its coverage mode (CEmode A or CEmode B). The UE may receive multiple reference repetition numbers and determine a reference repetition number based on its coverage mode (CEmode A or CEmode B). The reference value might be any value within the set. For example, the reference value may be the maximum value or the minimum value within the set.

The PUR DCI further includes an indication of scheduling delay based on the set of scheduling delay or the reference scheduling delay. The PUR DCI further includes an indication of repetition number based on the set of repetition number or the reference repetition number.

The PUR DCI further includes a fallback indication field. The fallback indication field may be 1 bit and used to indicate the UE to change from IDLE state to RRC-CONNECTED state and perform transmission via EDT (Early Data Transmission) or RACH.

Optionally, the PUR DCI may further include a predefined resource release indication field. The predefined resource release indication field may be 1 bit and used to indicate that the predefined resource configured in resource configuration is released.

Table 1 shows an example of PUR DCI content according to the first embodiment.

| Fallback indication | 1 bit | | |
|---|---|---|---|
| ACK/NACK field | ACK/NACK field = 1 | ACK/NACK field = 0 | |
| Retransmission type | | Indicator = 1 (Retransmission based on next PUR resource) | Indicator = 0 (Retransmission based on Dynamic scheduling) |
| | updated TA (offset: 6 bits) updated power (offset: 2 bits) updated repetition number (offset: 2 bit) Zero padding: 1 bit 13 bits in total | (PUR configuration modification for this TB) MCS, RV, repetition number (4 bits) Zero padding: 6 bits 13 bits in total | Dynamic retransmission grant resource assignment, scheduling delay, DCI repetition number, MCS, RV, repetition number (10 bits) No Zero padding 13 bits in total |

Table 1 does not contain the optional predefined resource release indication field. From the Table 1, it can be seen that the PUR DCI includes only 13 bits, that is significantly smaller than DCI format 6-0A or 6-0B. In addition, since different parameter sets (or different reference parameters) may be sent to the UE in advance, it is unnecessary to design two different PUR DCIs for CEmode A and CEmode B separately.

Incidentally, as can be seen from Table 1, except for the ACK/NACK field and the fallback indication field, the same bit may be used for different fields. For example, when the ACK/NACK field is 1 (ACK), there is no retransmission type field. Therefore, the bit for indicating the retransmission type in the condition of the ACK/NACK field being 0 (NACK) may be used for indicating a part of the updated TA.

In the PUR DCI according to the first embodiment, when the transmission on PUSCH by the UE in IDLE state is unsuccessfully received at the eNB, one bit in the PUR DCI is used to explicitly indicate the retransmission being based on the next PUR resource or based on the dynamic scheduling. In the PUR DCI according to a second embodiment, when the transmission on PUSCH by the UE in IDLE state is unsuccessfully received at the eNB, the dynamic scheduling is assumed.

Table 2 shows an example of PUR DCI according to the second embodiment.

| Fallback indication | 1 bit | |
|---|---|---|
| ACK/NACK field | ACK/NACK field = 1 | ACK/NACK field = 0 |
| | updated TA (offset: 6 bits) updated power (offset: 2 bits) updated repetition number (offset: 2 bits) | Dynamic retransmission grant resource assignment, scheduling delay, MCS, RV, repetition number, DCI repetition number (10 bits) Use one of the predefined states of {resource assignment scheduling delay, etc} for indicating retransmission based on next PUR, and use some others of predefined states for indicating fallback and/or predefined resource release |
| | No Zero padding 12 bits in total | No Zero padding 12 bits in total |

According to the second embodiment, the retransmission type field is not included. In the condition of ACK/NACK indication field indicating NACK (ACK/NACK field being set to 0), it is assumed that the retransmission is based on dynamic scheduling.

On the other hand, a predefined bit pattern of the PUR DCI may be used for indicating retransmission based on next PUR configuration. The predefined bit pattern means that one state of one field or one state for several fields in the PUR DCI is reserved. For example, suppose that the field for indicating resource assignment includes 4 bits, when the resource assignment field is [0000], it is not used to indicate resource assignment but used (reserved) to indicate retransmission based on next PUR. For another example, suppose that the field for indicating resource assignment includes 4 bits and the field for indicating scheduling delay includes 3 bits, when the resource assignment field is [0000] and the scheduling delay field is [111], it is used (reserved) to indicate retransmission based on next PUR.

The above-identified predefined bit pattern can be also used to indicate releasing PUR resource and/or fallback indication. That is, a second predefined bit pattern of the PUR DCI may be reserved for indicating releasing PUR resource. For example, suppose that the field for indicating resource assignment includes 4 bits and the field for indicating scheduling delay includes 3 bits, when the resource assignment field is [1111] and the scheduling delay field is [000], it is used (reserved) to indicate releasing PUR resource. A third predefined bit pattern of the PUR DCI may be reserved for indicating fallback. For example, suppose that the field for indicating repetition number includes 2 bits and the field for DCI repetition number includes 2 bits, when the repetition number field is [11] and the DCI repetition number field is [00], it is used (reserved) to indicate to fall back to EDT or RACH procedures.

In the above first and second embodiments, the UE monitors a search space where it expects to receive PUR DCI. The search space may be a common search space for all UEs or a UE-specific search space for a dedicated PUR (both are referred to as a PUR search space). That is to say, after data is transmitted on PUSCH, UE will monitor the PUSCH search space.

However, in IDLE state, UE also has to monitor the MPDCCH or NPDCCH type 1 common search space for paging and MPDCCH or NPDCCH type 2 common search space for RAR.

There is a possibility that the PUR search space might overlap with the type 1 common search space for paging or with the type 2 common search space for RAR in time or frequency domain. The overlapping may be a full or partial overlapping. In the condition of overlapping, the UE has to determine which search space to monitor.

A third embodiment proposes several options in the condition of search space overlapping.

In a first option, the UE is not required to monitor the MPDCCH or NPDCCH type 1 common search space or MPDCCH or NPDCCH type 2 common search space if either of the search space overlaps with the PUR search space. That is to say, the UE only monitors the PUR search space when the PUR search space overlaps with the MPDCCH or NPDCCH type 1 common search space or with the MPDCCH or NPDCCH type 2 common search space.

In a second option, the UE is not required to simultaneously monitor the PUR search space and the type 1 common search space or the type 2 common search space. That is to say, it is up to UE implementation that determines whether the UE monitors the PUR search space or monitors the type 1 common search space and the type 2 common search space. For example, the UE may always monitor the PUR search space. Alternatively, the UE may always monitor MPDCCH or NPDCCH type 1 common search space or the MPDCCH or NPDCCH type 2 common search space.

In a third option, the UE is expected to monitor the search space configured by the eNB. In the condition of search space overlapping, the eNB configures the UE which search space (the PUR search space or the type 1 common search space or the type 2 common search space) should be monitored.

In a fourth option, the UE is expected to monitor the search space determined by at least one of {period of paging occasion, period of predefine resource, period of control signal period, control signal monitoring window, etc}. For example, if the period of paging occasion is larger than a first threshold, the search space is always MPDCCH or NPDCCH type 1 common search space. If the control signal monitoring window is smaller than a second threshold, the search space is always PUR search space.

Due to search space overlapping, the paging message may be missed by the UE, for example, by the reason that the UE chooses or is required to monitor the PUR search space while the MPDCCH or NPDCCH type 1 common search space is not monitored. In this condition, urgent paging information (for example, SI modification, ETWS and CMAS) can be included in the PUR DCI transmitted within the PUR search space. The PUR DCI may reserve some bits (or some states of particular fields) for urgent paging information indication.

On the other hand, if the PUR DCI is missed due to the search space overlapping, ACK/NACK information can be included in paging DCI (the DCI derived by searching the type 1 common search space for paging), for example by using a predefined bit pattern of the paging DCI, i.e. the reserved bits or unused states or combined states of several fields, to indicate the ACK or NACK to the uplink transmission based on PUR. In particular, the ACK/NACK information is included in the paging DCI when the type 1 common search space will be searched in the condition of search space overlapping. Similarly, the ACK/NACK information may be included in RAR DCI (the DCI derived by searching the type 2 common search space for RAR) in a similar manner, especially when the type 2 common search space will be searched in the condition of search space overlapping.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE) remote unit, the method comprising:
   transmitting a data in a predefined resource based on a resource configuration; and
   receiving a control signal in a first search space, wherein the control signal includes a downlink control information (DCI) format that includes:
      a first DCI field comprising a response to the data or a fallback indication; and
      a second DCI field comprising an updated data transmission repetition.

2. The method of claim 1, wherein the response to the data is comprises an acknowledgement (ACK) or a negative ACK (NACK).

3. The method of claim 1, wherein the updated data transmission repetition is an index of a data transmission repetition set or an index offset to an index corresponding to previously adopted data transmission repetition.

4. The method of claim 1, further comprising receiving multiple sets of scheduling delay, and determining a set of scheduling delay based on a coverage mode, wherein the control signal further includes an indication of a scheduling delay based on the set of scheduling delay.

5. The method of claim 1, further comprising receiving multiple reference scheduling delays, and determining a reference scheduling delay based on a coverage mode, wherein the control signal further includes an indication of scheduling delay based on the reference scheduling delay.

6. The method of claim 1, further comprising receiving multiple sets of repetition number, and determining a set of repetition number based on a coverage mode, wherein the control signal further includes an indication of repetition number based on the set of repetition number.

7. The method of claim 1, further comprising receiving multiple reference repetition numbers, and determining a reference repetition number based on a coverage mode, wherein the control signal further includes an indication of repetition number based on the reference repetition number.

8. The method of claim 1, wherein the resource configuration includes at least one of a scheduling delay set, a repetition number set, a reference scheduling delay and a reference repetition number.

9. The method of claim 8, wherein the control signal further includes an indication of scheduling delay based on the scheduling delay set or the reference scheduling delay.

10. The method of claim 8, wherein the control signal further includes an indication of repetition number based on the repetition number set or the reference repetition number.

11. The method of claim 1, further comprising monitoring a second search space for paging message or random access, wherein the second search space is partially or fully overlapped with the first search space in a time or frequency resource.

12. A user equipment (UE), comprising:
   at least one memory; and
   at least one processor coupled with the at least one memory and configured to cause the UE to:
      transmit a data in a predefined resource based on a resource configuration; and
      receive a control signal in a first search space, wherein the control signal includes a downlink control information (DCI) format that includes:
         a first DCI field comprising_a response to the data or a fallback indication; and
         a second DCI field comprising an updated data transmission repetition.

13. The UE of claim 12, wherein the response to the data is comprises an acknowledgement (ACK) or a negative ACK (NACK).

14. The UE of claim 12, wherein the updated data transmission repetition is an index of a data transmission repetition set or an index offset to an index corresponding to previously adopted data transmission repetition.

15. The UE of claim 12, wherein the at least one processor is configured to cause the UE to monitor a second search space for paging message or random access, wherein the second search space is partially or fully overlapped with the first search space in a time or frequency resource.

16. A base station, comprising:
   at least one memory; and
   at least one processor coupled with the at least one memory and configured to cause the base station to:
      receive a data in a predefined resource based on a resource configuration; and
      transmit a control signal, wherein the control signal includes a downlink control information (DCI) format that includes:
         a first DCI field comprising a response to the data or a fallback indication; and
         a second DCI field comprising_an updated data transmission repetition.

17. The base unit station of claim 16, wherein the response to the data is comprises an acknowledgement (ACK) or a negative ACK (NACK).

18. A processor for wireless communication, comprising:
   at least one controller coupled with at least one memory and configured to cause the processor to:
      transmit a data in a predefined resource based on a resource configuration; and receive a control signal in a first search space, wherein the control signal includes a downlink control information (DCI) format that includes:
a first DCI field comprising a response to the data or a fallback indication; and
a second DCI field comprising an updated data transmission repetition.

* * * * *